United States Patent
Vash et al.

(10) Patent No.: US 9,207,753 B2
(45) Date of Patent: *Dec. 8, 2015

(54) MULTIPLE-QUEUE MULTIPLE-RESOURCE ENTRY SLEEP AND WAKEUP FOR POWER SAVINGS AND BANDWIDTH CONSERVATION IN A RETRY BASED PIPELINE

(71) Applicant: Intel Corporation, Santa Clara, CA (US)

(72) Inventors: James R. Vash, Littleton, MA (US);
Pritpal S. Ahuja, Clinton, MA (US);
Bongjin Jung, Westford, MA (US);
Jeffrey D. Chamberlain, Tracy, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/519,584

(22) Filed: Oct. 21, 2014

(65) Prior Publication Data
US 2015/0160720 A1 Jun. 11, 2015

Related U.S. Application Data

(63) Continuation of application No. 12/978,592, filed on Dec. 26, 2010, now Pat. No. 8,868,951.

(60) Provisional application No. 61/290,203, filed on Dec. 26, 2009.

(51) Int. Cl.
*G06F 1/32* (2006.01)
*G06F 13/00* (2006.01)
*G06F 13/16* (2006.01)
*H04L 29/00* (2006.01)

(52) U.S. Cl.
CPC .............. *G06F 1/3293* (2013.01); *G06F 13/00* (2013.01); *G06F 13/1642* (2013.01); *H04L 29/00* (2013.01); *Y02B 60/1228* (2013.01)

(58) Field of Classification Search
CPC ... G06F 1/3203; G06F 1/3206; G06F 1/3225; G06F 1/3275
USPC .......................................... 713/320, 323, 324
See application file for complete search history.

(56) References Cited

U.S. PATENT DOCUMENTS

| | | |
|---|---|---|
| 5,778,438 A | 7/1998 | Merchant |
| 5,875,467 A | 2/1999 | Merchant |
| 5,893,151 A | 4/1999 | Merchant |
| 6,473,819 B1 | 10/2002 | Jackson et al. |
| 6,804,239 B1 | 10/2004 | Lussier et al. |
| 8,868,951 B2 * | 10/2014 | Vash et al. .................... 713/323 |
| 2004/0088523 A1 | 5/2004 | Kessler et al. |
| 2004/0133744 A1 | 7/2004 | Van Doren et al. |
| 2011/0131438 A1 | 6/2011 | Levitan |

* cited by examiner

*Primary Examiner* — Chun Cao
(74) *Attorney, Agent, or Firm* — Alpine Technology Law Group LLC (57) ABSTRACT

Methods and apparatus relating to multiple-queue multiple-resource entry sleep and wakeup for power savings and bandwidth conservation in a retry based pipeline are described. In one embodiment, a bit indicates whether a corresponding queue entry is asleep or awake with respect to arbitration for resources in a retry based pipeline. Furthermore, multiple entries from different queues may be grouped together and multiple resources may be grouped together. Other embodiments are also disclosed.

24 Claims, 5 Drawing Sheets

MULTIPLE-QUEUE MULTIPLE-RESOURCE ENTRY SLEEP AND WAKEUP FOR POWER SAVINGS AND BANDWIDTH CONSERVATION IN A RETRY BASED PIPELINE

FIELD

The present disclosure generally relates to the field of electronics. More particularly, an embodiment of the invention relates to multiple-queue multiple-resource entry sleep and wakeup for power savings and bandwidth conservation in a retry based pipeline.

BACKGROUND

Generally, a pipeline may include a number of processing elements to service requests. A retry pipeline may allow for retrying of requests that fail to be serviced. A retry based pipeline has an inherent inefficiency. When transactions are retried, they have effectively wasted both power and pipeline bandwidth, since no forward progress has been made. However, for certain designs, the benefits of a retry based pipeline may outweigh the costs. The primary benefits include the ability to hide the latency to determine the resources a transaction requires to complete.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Some embodiments discussed herein may reduce wasted power consumption and/or pipeline bandwidth associated with retrying a transaction in a retry based pipeline. In an embodiment, a transaction sleep/wakeup scheme is introduced that supports multiple transaction queues and multiple resources, which may be required by a transaction being retried.

Figure 1:
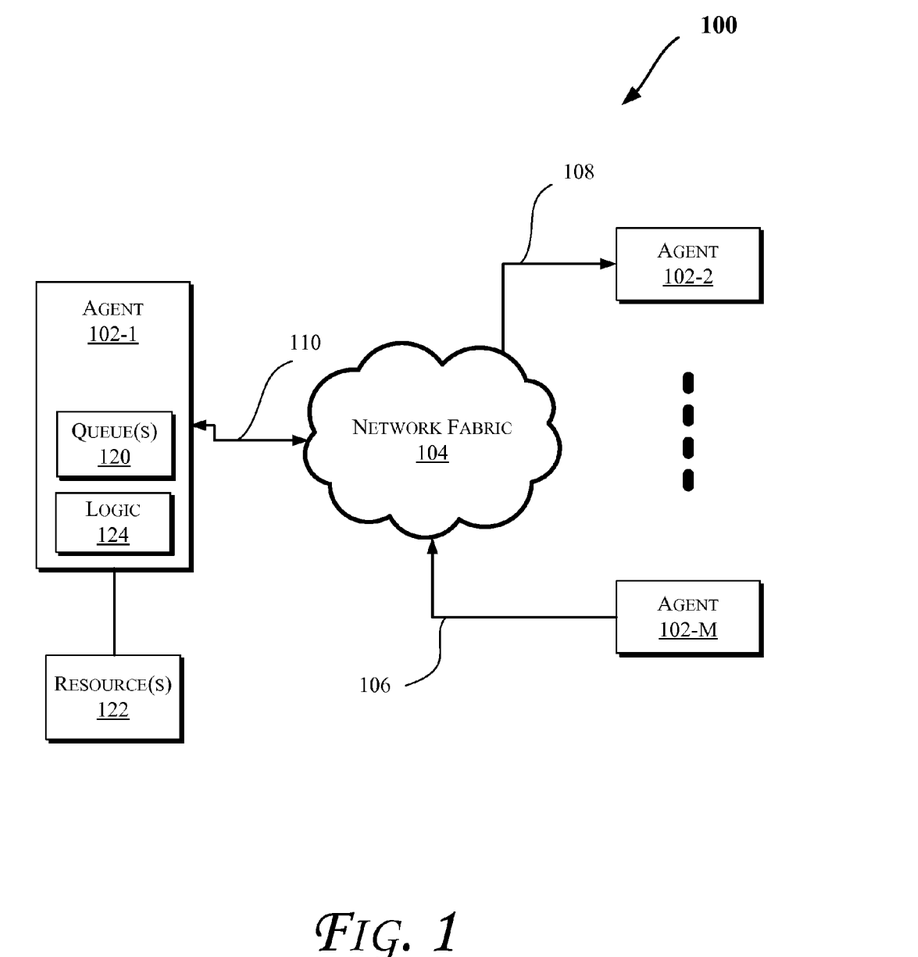
FIGS. 1-2 and 4-5 illustrate block diagrams of embodiments of computing systems, which may be utilized to implement various embodiments discussed herein.

Various computing systems may be used to implement embodiments, discussed herein, such as the systems discussed with reference to FIGS. 1-2 and 4-5. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, one or more of the agents 102 may be any of components of a computing system, such as the computing systems discussed with reference to FIGS. 4-5.

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Additionally, at least one of the agents 102 may be a home agent and one or more of the agents 102 may be requesting or caching agents as will be further discussed herein. As shown, at least one agent (only one shown for agent 102-1) may have access to one or more queues 120 (which may be register files dedicated to the agent or shared with other agents) to store one or more transactions. Also, agent 102-1 may have access to other resource(s) 122 as will be discussed below, e.g., with reference to FIG. 3. Further, agent 102-1 may include logic 124 to perform operation(s) associated with a transaction sleep/wakeup scheme which supports multiple transaction queues (e.g., queue(s) 120 as will be discussed below, e.g., with reference to FIG. 3) and/or multiple resources 122, which may be required by a transaction being retried in some embodiments. In an embodiment, the queue(s) 120 are provided on the same integrated circuit (IC) chip as a caching agent.

Figure 2:
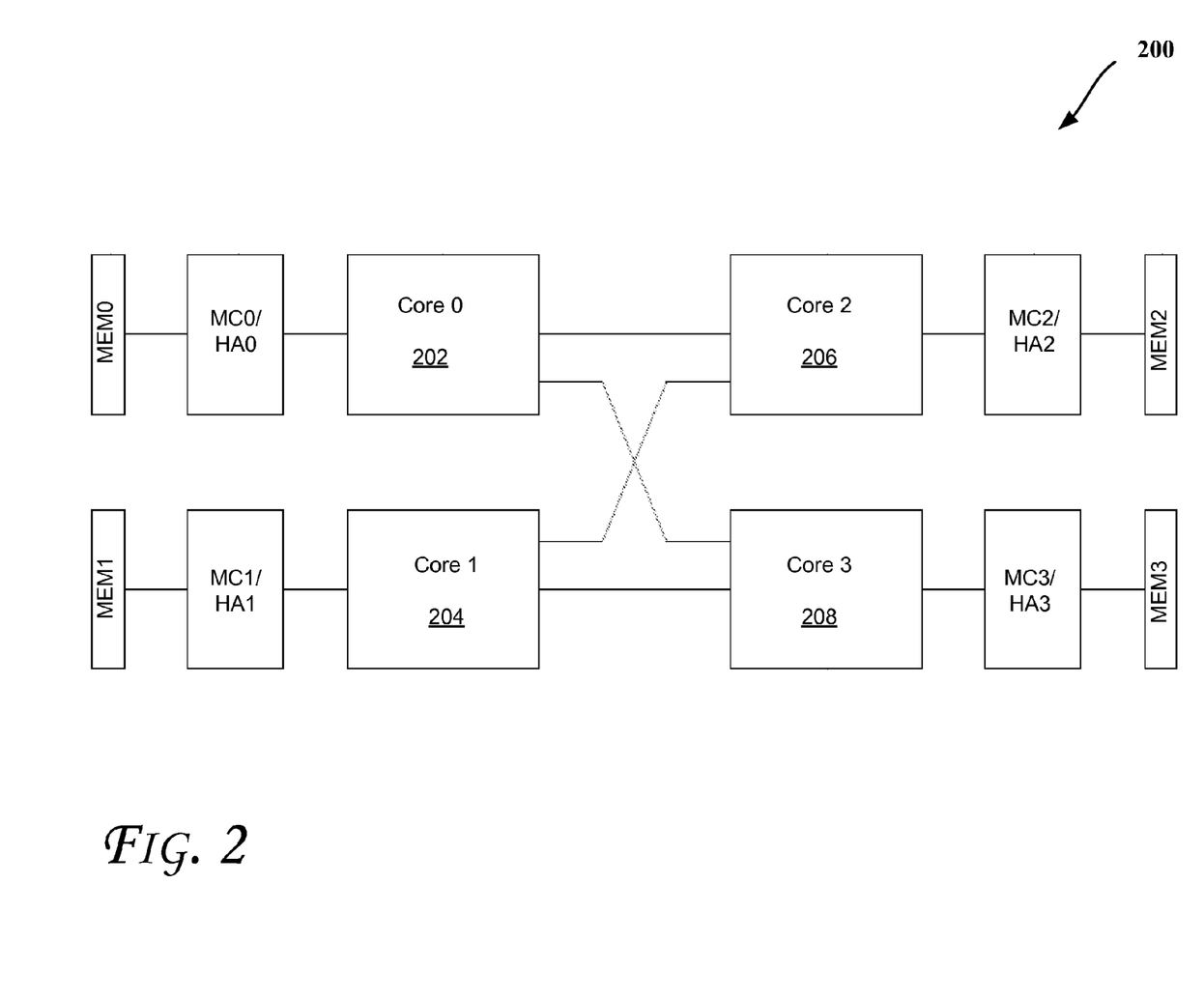

FIG. 2 is a block diagram of a computing system in accordance with an embodiment. System 200 may include a plurality of sockets 202-208 (four shown but some embodiments may have more or fewer sockets). Each socket may include a processor in an embodiment. Also, each socket may be coupled to the other sockets via point-to-point (PtP) link such as discussed with reference FIG. 5. As discussed with respect to FIG. 1 with reference to the network fabric 104, each socket may be coupled to a local portion of system memory, e.g., formed of a plurality of Dual Inline Memory Modules (DIMMs) that may include dynamic random access memory (DRAM).

As shown in FIG. 2, each socket may be coupled to a memory controller (MC)/Home Agent (HA) (such as MC0/

HA0 through MC3/HA3). The memory controllers may be coupled to a corresponding local memory (labeled as MEM0 through MEM3), which may be a portion of system memory (such as memory 512 of FIG. 5). In some embodiments, the memory controller (MC)/Home Agent (HA) (such as MC0/ HA0 through MC3/HA3) may be the same or similar to agent 102-1 of FIG. 1 and the memory, labeled as MEM0 through MEM3. Also, in one embodiment, MEM0 through MEM3 may be configured to mirror data, e.g., as master and slave. Also, one or more components of system 200 may be included on the same integrated circuit die in some embodiments. An implementation such as shown in FIG. 2 thus may be for a socket glueless configuration with mirroring.

Figure 4:
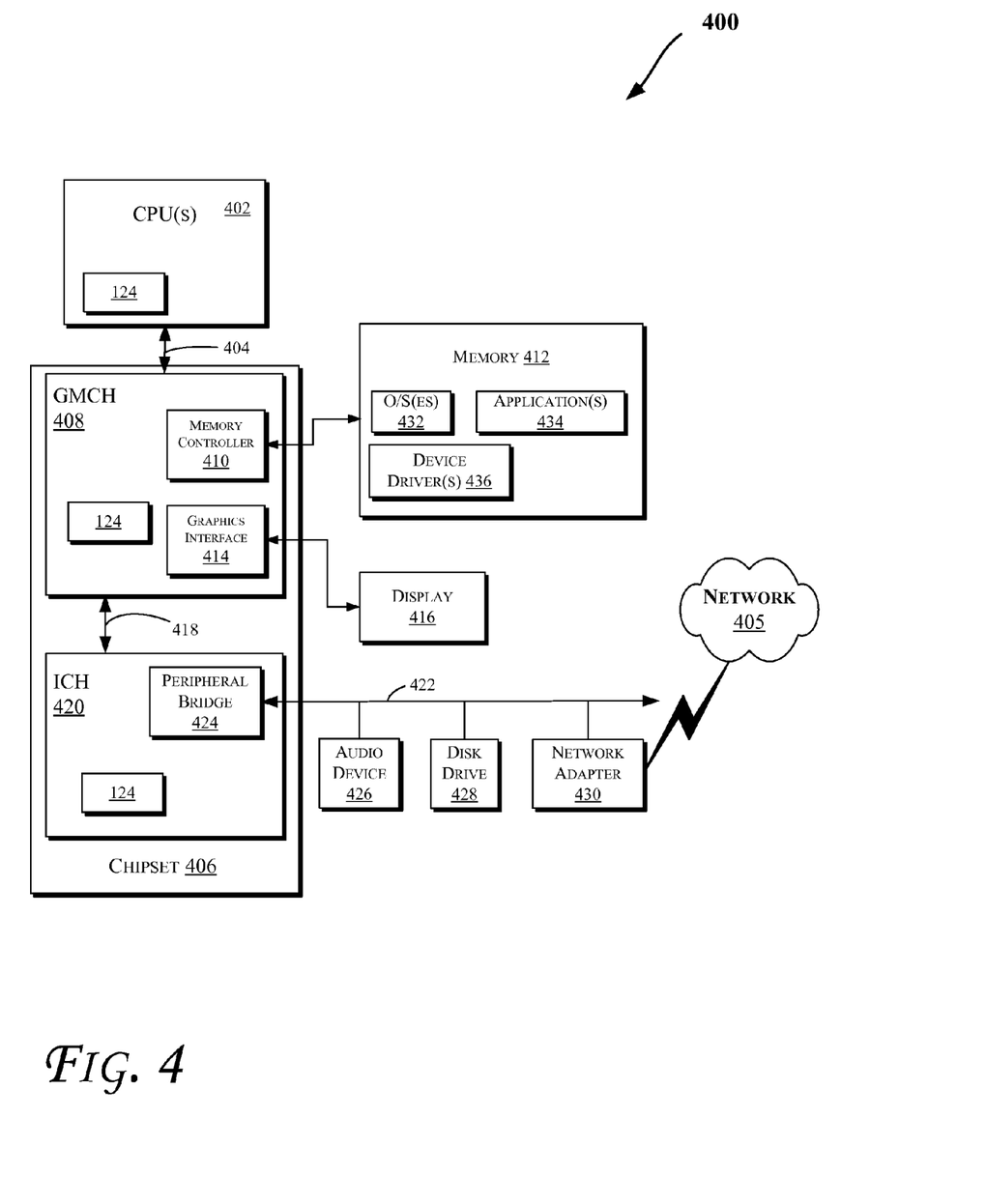
Figure 5:
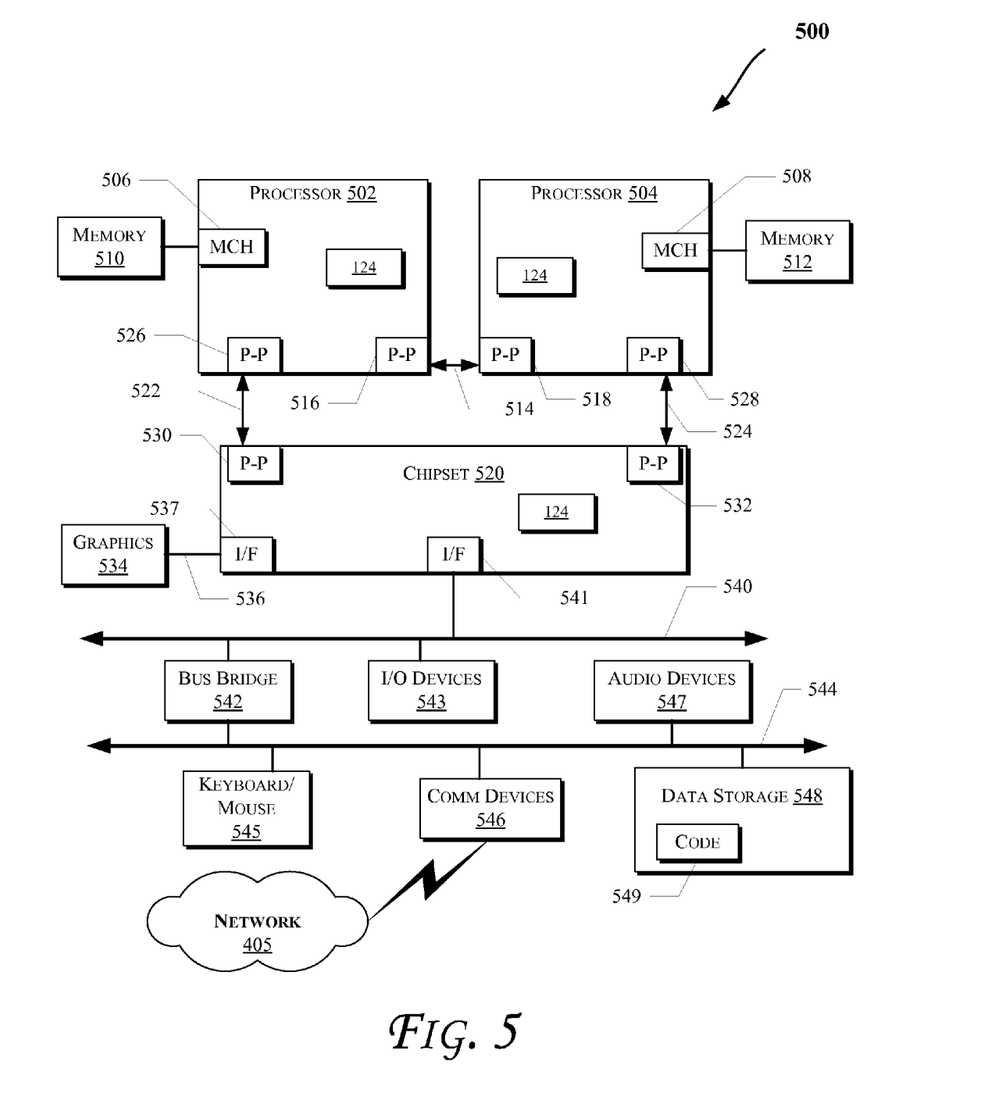

Some processors include multiple cores and multiple levels of cache integrated on a single die (such as discussed herein with reference to FIG. 1 or 4-5). For example, some Xeon® processors (available from Intel® Corporation) have eight cores which share a 24 MB LLC (last level cache). There may be multiple instances (e.g., 8 instances) of an LLC cache controller, each responsible for servicing requests for a slice of the LLC (e.g., a 3 MB slice). The cores, LLC cache controllers, and system interface are coupled by a shared ring interconnect. The LLC cache controller may have a retry based pipeline. Messages received by the cache controller from the ring interconnect, and some transactions generated internally (e.g., cache victims) allocate in Ingress (IGR) Queues. There may be three request queues: (1) IRQ (Ingress Request Queue: local core/agent requests); (2) IPQ (Ingress Probe Queue: system snoops by remote cores/agents); and (3) VIQ (Victim Queue: cache victims). There may also be three response queues: (1) IDQ (Ingress Data Queue: core/system data responses); (2) ICQ (Ingress Completion Queue: system non data responses); and (3) SRQ (Snoop Response Queue: core non data responses).

All queues with arb-ready (arbitration ready) entries may arbitrate for a single shared pipeline. The winning queue sends a transaction down the pipeline. The pipeline includes reading LLC arrays (e.g., tag, state, and data), looking up the QPI (Quick Path Interconnect) SAD (source address decoder), checking the QPI ORB (outstanding request buffer), a.k.a. MAF (miss address file) for conflicting transactions, and feeding this information into coherence and response logic, which is responsible for checking and acquiring necessary resources, generating messages in response, and making a final acceptance or rejection decision (acknowledgement (ack)/negative acknowledgement (nack)). This process may take roughly 10 pipeline stages in some current processors.

In turn, IGR may select a transaction every N cycles (e.g., two in the example discussed above) to maintain a throughput to match the LLC data bandwidth capability (e.g., 32B, or one half cache line, per cycle for the above-discussed example). As the pipeline latency is much greater than the desired throughput, a retry based pipeline is used. Several resources that need to be acquired primarily by request queue transactions have a relatively long lifetime compared to the transaction retry rate. For instance, resources associated with system interface queues (such as System Box (Sbox; to interface the ring interconnect to QPI)) FIFO (First-In, First-Out) credits), and resources associated with QPI requests to memory (Sbox Request Table (SRT) credits, QPI RTIDs (where RTID refers to Request Transaction Identifier), may be held for 10 s or 100 s of cycles at a minimum, respectively.

In some embodiments, to increase power efficiency and/or conserve pipeline bandwidth, some embodiments utilize a per-entry sleep state which may prevent arbitration after being nacked, e.g., due to the lack of certain long lifetime resources. The three request queues shown (i.e., IPQ, IRQ, and VIQ) are the primary agents that compete for long lifetime resources. Each entry in these queues may have a corresponding sleep bit. The sleep bit is set when the entry has been nacked by the pipeline due to the lack of certain resources. Setting this bit prevents further arbitration by that entry until it is cleared. While a set sleep bit is used herein to indicate no arbitration, this may easily be changed to where a clear bit indicates the same, depending on the implementation.

An embodiment may, upon the return of a particular resource, choose from only the set of entries which required exactly that resource, selecting a single one in some priority order (e.g., age, interdependency with other sleeping transactions), and wake up that entry alone. In some alternate embodiments with larger number of entries and/or number of resources, the following two concepts may be used to provide additional scalability: (1) Buckets: A set of resources due to the lack of which entries may be put to sleep; and (2) Regions: A set of entries among a plurality of queues which are awakened as a group. In some embodiments, a region may comprise only one entry and a bucket may comprise only one resource.

Figure 3:
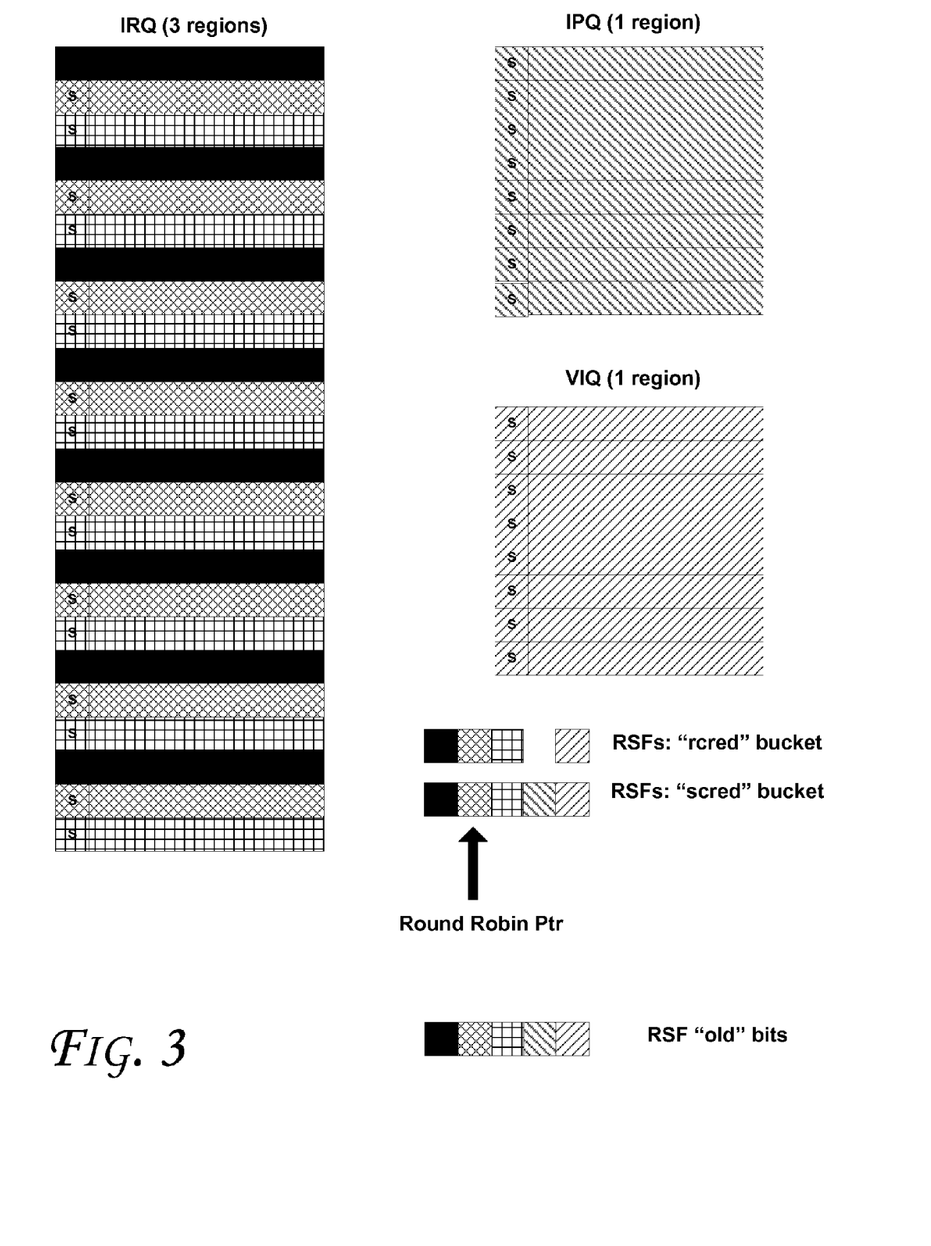
FIG. 3 illustrates a diagram of various regions and buckets for queue entries, according to some embodiments.

More particularly, FIG. 3 illustrates a block diagram of various regions and buckets for queue entries, according to some embodiments. As shown, there may be three queues, five regions, two buckets, per-entry sleep bits, per-bucket per-region sleep flags, region sleep flag "old" bits, and a single round robin pointer as discussed herein.

In one embodiment, the following two buckets may be used: (1) "scred" (Sbox FIFO credits, e.g., including: HOM (coherent requests and snoop responses), SNP (coherent snoop requests), NCB (non-coherent posted requests), NCS (non-coherent non-posted requests), DRS (data responses), and NDR (non-data responses)); and (2) "rcred" (SRT and RTID credits). In an embodiment (such as illustrated in FIG. 3), the following five regions may be used: (1) Three interleaved 8-entry regions in the 24-entry IRQ; (2) One 8-entry region in the 8-entry IPQ; and (3) One 8-entry region in the 8-entry VIQ.

In some embodiments, for each region, there is a set of RSFs (region sleep flags), e.g., one per bucket. When an entry in a given region goes to sleep, the corresponding RSF(s) is/are set based on which resource(s) it attempted and failed to acquire. This may be in addition to setting the per-entry sleep bit.

When a resource is returned, it first considers which regions are candidates for wakeup, e.g., based on the possible resources that entries in the region may require. For instance, for "scred", the following may be used: (1) IRQ regions: {HOM, SNP, NCB, NCS, DRS} Sbox FIFO credits; (2) IPQ region: {HOM, DRS, NDR} Sbox FIFO credits; and (3) VIQ region: {HOM, NCB, NCS, DRS} Sbox FIFO credits. For "rcred", the following may be used: (1) IRQ regions: SRT and RTID credits not reserved for victims; (2) IPQ region: None; and (3) VIQ region: All SRT and RTID credits.

In some embodiments, special consideration needs to be given when multiple buckets have a resource return occur simultaneously. Based on the regions that qualify, the relevant RSFs are consulted for the given bucket. From among the regions that qualify and have the relevant RSF bit set, one is selected to wakeup. All entries in the selected region have their sleep bit cleared. In some embodiments, the selection is done in a round-robin fashion, e.g., in accordance with a single round-robin pointer (as opposed to one pointer per bucket for example). The pointer is advanced only if the winner selected would have won even if all regions with either RSF bit set had qualified. This ensures that no region with sleeping entries is repeatedly skipped over when it does not qualify. Alternative region wakeup selection policies are also possible, instead of the round robin policy described herein. For instance, giving certain regions priority over others based on the latter's dependence on the former's progress may also help to avoid deadlock.

In an embodiment, for safety, all entries in all regions with any RSF set will wakeup in this case. An additional safety mechanism provides for a periodic wakeup (e.g., based on a free-running counter) of all entries in all regions with any RSF set. Also, for safety, when the last of any resource within a bucket returns, all entries in all regions with the relevant RSF set may wakeup. When a lock transaction is outstanding, the second-to-last "rcred" resource to return may be considered as the last (since the lock holds the last resource).

In some embodiments, the retry based pipeline may use an anti-starvation mechanism for the IGR queues. The anti-starvation mechanism may divide entries into "new" and "old". An "old" entry is one which has been nacked when its queue is in normal mode (i.e., not tracking the draining of "old" entries). Other entries are considered "new". In an embodiment, logic (such as logic 124) may ensure that sleeping entries do not violate any invariants of the anti-starvation mechanism in the following ways:

(1) When an "old" entry is put to sleep, the RSF "old" bit is set for that region.

(2) When a queue enters normal mode, remaining valid entries (which are all "new") become "old". For any region which has an RSF set for either bucket ("scred" or "rcred"), the RSF "old" bit is set for that region.

(3) If a queue has the RSF "old" bit set for any of its regions, it may not return to normal mode.

(4) When a queue enters starvation mode, all entries in all regions of the queue with any RSF set will wakeup.

In an embodiment, the RSF "old" bit is used since otherwise only bidding and in-flight "old" entries are tracked by the anti-starvation logic to determine when to return to normal mode. Making remaining valid entries "old" when entering normal mode ensures that entries are not prevented from becoming "old" due to sleep. Waking sleeping entries when entering starvation mode ensures there is no unforeseen cross-product between sleep and starvation.

Moreover, the region/bucket scheme, grouping different entries and resources together, makes use of the above detailed considerations and safety mechanisms in order to avoid entries sleeping on a resource even after all such resources have been returned, or entries sleeping on a resource whose forward progress is required for further resources to be returned, potentially leading to deadlock. Also, current methods such as those in an instruction queue scheduler generally require expensive dependency matrices that grow as $N^2$ and may require custom dynamic circuitry to implement.

FIG. 4 illustrates a block diagram of an embodiment of a computing system 400. One or more of the agents 102 of FIG. 1 may comprise one or more components of the computing system 400. Also, one or more components of FIG. 4 may include logic 124 of FIG. 1. Also, logic 124 may be present in components other than those shown. The computing system 400 may include one or more central processing unit(s) (CPUs) 402 (which may be collectively referred to herein as "processors 402" or more generically "processor 402") coupled to an interconnection network (or bus) 404. The processors 402 may be any type of processor such as a general purpose processor, a network processor (which may process data communicated over a computer network 405), etc. (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors.

The processor 402 may include one or more caches which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 400. Additionally, such cache(s) may be located in various locations (e.g., inside other components) to the computing systems discussed herein.

A chipset 406 may additionally be coupled to the interconnection network 404. Further, the chipset 406 may include a graphics memory control hub (GMCH) 408. The GMCH 408 may include a memory controller 410 that is coupled to a memory 412. The memory 412 may store data, e.g., including sequences of instructions that are executed by the processor 402, or any other device in communication with components of the computing system 400. Also, in one embodiment of the invention, the memory 412 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 404, such as multiple processors and/or multiple system memories.

The GMCH 408 may further include a graphics interface 414 coupled to a display device 416 (e.g., via a graphics accelerator in an embodiment). In one embodiment, the graphics interface 414 may be coupled to the display device 416 via an accelerated graphics port (AGP). In an embodiment of the invention, the display device 416 (such as a flat panel display) may be coupled to the graphics interface 414 through, for example, a signal converter that translates a digital representation of an image stored in a storage device such as video memory or system memory (e.g., memory 412) into display signals that are interpreted and displayed by the display 416.

As shown in FIG. 4, a hub interface 418 may couple the GMCH 408 to an input/output control hub (ICH) 420. The ICH 420 may provide an interface to input/output (I/O) devices coupled to the computing system 400. The ICH 420 may be coupled to a bus 422 through a peripheral bridge (or controller) 424, such as a peripheral component interconnect (PCI) bridge that may be compliant with the PCIe specification, a universal serial bus (USB) controller, etc. The bridge 424 may provide a data path between the processor 402 and peripheral devices. Other types of topologies may be utilized. Also, multiple buses may be coupled to the ICH 420, e.g., through multiple bridges or controllers. Further, the bus 422 may comprise other types and configurations of bus systems. Moreover, other peripherals coupled to the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 422 may be coupled to an audio device 426, one or more disk drive(s) 428, and a network adapter 430 (which may be a NIC in an embodiment). In one embodiment, the network adapter 430 or other devices coupled to the bus 422 may communicate with the chipset 406. Also, various components (such as the network adapter 430) may be coupled to the GMCH 408 in some embodiments of the invention. In addition, the processor 402 and the GMCH 408 may be combined to form a single chip. In an embodiment, the memory controller 410 may be provided in one or more of the CPUs 402. Further, in an embodiment, GMCH 408 and ICH 420 may be combined into a Peripheral Control Hub (PCH).

Additionally, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 412 may include one or more of the following in an embodiment: an operating system (O/S) 432, application 434, and/or device driver 436. The memory 412 may also include regions dedicated to Memory Mapped I/O (MMIO) operations. Programs and/or data stored in the memory 412 may be swapped into the disk drive 428 as part of memory management operations. The application(s) 434 may execute (e.g., on the processor(s) 402) to communicate one or more packets with one or more computing devices coupled to the network 405. In an embodiment, a packet may be a sequence of one or more symbols and/or values that may be encoded by one or more electrical signals transmitted from at least one sender to at least on receiver (e.g., over a network such as the network 405). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 405).

In an embodiment, the application 434 may utilize the O/S 432 to communicate with various components of the system 400, e.g., through the device driver 436. Hence, the device driver 436 may include network adapter 430 specific commands to provide a communication interface between the O/S 432 and the network adapter 430, or other I/O devices coupled to the system 400, e.g., via the chipset 406.

In an embodiment, the O/S 432 may include a network protocol stack. A protocol stack generally refers to a set of procedures or programs that may be executed to process packets sent over a network 405, where the packets may conform to a specified protocol. For example, TCP/IP (Transport Control Protocol/Internet Protocol) packets may be processed using a TCP/IP stack. The device driver 436 may indicate the buffers in the memory 412 that are to be processed, e.g., via the protocol stack.

The network 405 may include any type of computer network. The network adapter 430 may further include a direct memory access (DMA) engine, which writes packets to buffers (e.g., stored in the memory 412) assigned to available descriptors (e.g., stored in the memory 412) to transmit and/or receive data over the network 405. Additionally, the network adapter 430 may include a network adapter controller, which may include logic (such as one or more programmable processors) to perform adapter related operations. In an embodiment, the adapter controller may be a MAC (media access control) component. The network adapter 430 may further include a memory, such as any type of volatile/nonvolatile memory (e.g., including one or more cache(s) and/or other memory types discussed with reference to memory 412).

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (GMCH) 506 and 508 to enable communication with memories 510 and 512. The memories 510 and/or 512 may store various data such as those discussed with reference to the memory 512 of FIG. 5. As shown in FIG. 5, the processors 502 and 504 (or other components of system 500 such as chipset 520, I/O devices 543, etc.) may also include one or more cache(s) such as those discussed with reference to FIGS. 1-4.

In an embodiment, the processors 502 and 504 may be one of the processors 502 discussed with reference to FIG. 5. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

In at least one embodiment, logic 124 may be provided in one or more of the processors 502, 504 and/or chipset 520. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5. However, logic 124 may be provided in locations throughout the system 500, including or excluding those illustrated.

The chipset 520 may communicate with the bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 505), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., circuitry), software, firmware, microcode, or combinations thereof, which may be provided as a computer program product, e.g., including a machine-readable or computer-readable (e.g., non-transitory) medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein. Additionally, such computer-readable media may be downloaded as a computer program product, wherein the program may be transferred from a remote computer (e.g., a server) to a requesting computer (e.g., a client) through data signals provided via a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a first queue to store a first plurality of entries;
a second queue to store a second plurality of entries; and
logic to select a region, corresponding to a set of entries among the first and second queues, to be awakened based on: region sleep flags or region priorities,
wherein each of the first plurality of entries and second plurality of entries is to comprise a first bit to indicate whether an entry is asleep and wherein an arbitration of the entry is to be performed based on a status of the first bit.

2. The apparatus of claim 1, wherein the first bit is to indicate whether the entry is asleep due to unavailability of a resource.

3. The apparatus of claim 1, wherein the first bit is to indicate whether the entry is asleep due to unavailability of a plurality of resources.

4. The apparatus of claim 1, wherein the first bit is modified to indicate the entry is asleep based on unavailability of a resource.

5. The apparatus of claim 4, wherein upon return of the resource, the first bit is to be modified to indicate the entry is awake for arbitration.

6. The apparatus of claim 4, wherein a third plurality of a subset of the first plurality of entries and second plurality of entries are to be grouped into a region and wherein upon return of the resource, the first bit of all entries in the region is to be modified as a group to indicate that all entries in the region are awake for arbitration.

7. The apparatus of claim 1, wherein the first plurality of entries correspond to a plurality of local requests and wherein the second plurality of entries correspond to a plurality of remote requests.

8. The apparatus of claim 1, further comprising a third queue to store a third plurality of entries corresponding to a plurality of cache victims.

9. The apparatus of claim 1, further comprising logic to divide entries into new and old entries, wherein an old entry has been negatively acknowledged when its queue is in normal mode and wherein remaining entries are considered new.

10. The apparatus of claim 1, wherein the first bit is modified to indicate the entry is asleep based on unavailability of a resource and wherein upon return of the resource, the first bit is to be modified for all entries in a region to indicate the region is awake for arbitration based on a round-robin selection.

11. The apparatus of claim 1, further comprising a retry based pipeline coupled to the first or second queues to service requests of the first or second queues.

12. A method comprising:
storing a first plurality of entries in a first queue;
storing a second plurality of entries in a second queue, wherein each of the first plurality of entries and second plurality of entries is to comprise a first bit to indicate whether an entry is asleep;
determining whether to arbitrate the entry in a retry based pipeline based on a status of the first bit;
modifying the first bit in response to availability of a resource in the retry based pipeline; and
selecting which one or more entries from the first and second plurality of entries are to be awakened in response to availability of the resource.

13. The method of claim 12, further comprising selecting which region is to be awakened in response to availability of the resource and based on a priority of a plurality of regions.

14. A system comprising:
one or more of a first queue and second queue, wherein the first queue is to store a first plurality of entries and the second queue is to store a second plurality of entries;
a processor to modify a first bit, corresponding to each of the first plurality of entries and second plurality of entries, to indicate whether an entry is asleep; and
logic to select a region, corresponding to a set of entries from the first queue or the second queue, to be awakened based on: region sleep flags or region priorities,
wherein an arbitration of the entry is to be performed based on a status of the first bit.

15. The system of claim 14, wherein the processor is to prioritize waking of the first and second plurality of entries.

16. The system of claim 14, wherein the first bit is modified to indicate the entry is asleep based on unavailability of a resource in a bucket and wherein upon return of any resource in the bucket, the first bit is to be modified to indicate the entry is awake for arbitration when a region corresponding to the entry is chosen based on a round-robin selection.

17. The system of claim 14, wherein the first bit is to indicate whether the entry is asleep due to unavailability of a resource.

18. An apparatus comprising:
a first queue to store a first plurality of entries;
a second queue to store a second plurality of entries; and
logic to divide entries into new and old entries, wherein an old entry has been negatively acknowledged when its queue is in normal mode and wherein remaining entries are considered new,
wherein each of the first plurality of entries and second plurality of entries is to comprise a first bit to indicate whether an entry is asleep and wherein an arbitration of the entry is to be performed based on a status of the first bit.

19. The apparatus of claim 18, further comprising logic to select a region, corresponding to a set of entries among the first and second queues, to be awakened based on: region sleep flags or region priorities.

20. The apparatus of claim 18, wherein the first bit is to indicate whether the entry is asleep due to unavailability of a resource.

21. The apparatus of claim 18, wherein the first bit is to indicate whether the entry is asleep due to unavailability of a plurality of resources.

22. The apparatus of claim 18, wherein the first bit is modified to indicate the entry is asleep based on unavailability of a resource.

23. A method comprising:
   storing a first plurality of entries in a first queue;
   storing a second plurality of entries in a second queue, wherein each of the first plurality of entries and second plurality of entries is to comprise a first bit to indicate whether an entry is asleep;
   determining whether to arbitrate the entry in a retry based pipeline based on a status of the first bit;
   modifying the first bit in response to availability of a resource in the retry based pipeline; and
   selecting which region is to be awakened in response to availability of the resource and based on a priority of a plurality of regions.

24. The method of claim 23, further comprising selecting which one or more entries from the first and second plurality of entries are to be awakened in response to availability of the resource.

* * * * *